April 15, 1958     O. H. DRAGER     2,830,675
SAND OR EARTH FILTER

Filed Dec. 27, 1954     2 Sheets-Sheet 1

INVENTOR
Otto Heinrich Drager

BY
Bailey, Stephens & Huettig
ATTORNEYS

April 15, 1958     O. H. DRAGER     2,830,675
SAND OR EARTH FILTER

Filed Dec. 27, 1954     2 Sheets-Sheet 2

INVENTOR
*Otto Heinrich Drager*

BY
ATTORNEYS

2,830,675

SAND OR EARTH FILTER

Otto Heinrich Drager, Lubeck, Germany

Application December 27, 1954, Serial No. 477,843

Claims priority, application Germany November 19, 1954

3 Claims. (Cl. 183—49)

This invention relates to the construction of sand or earth filters. In particular the invention is directed to the construction of an air filter for air raid shelter purposes.

Air must be supplied to air raid shelters, and it is desired that poisonous and harmful elements be filtered from such air. Granular filter material is used for this purpose in the form of sand or earth. The filter chamber may be located outside the air raid shelter and connected therewith by ducts. Moreover, the air raid shelter should be provided with more than one closable exit.

An object of the instant invention is to simplify the construction of shelters by employing one of the exits as an air filtering means. A further object of the invention is to provide a shelter with a filter, which can also be used as an emergency escape exit.

In general, these objects are obtained by constructing a filter shaft outside of a shelter, but communicating therewith. Partially filling this shaft is the filtering material supported upon a removable bottom. When it is necessary to use the emergency shaft, the bottom is removed, thus dumping the filter material to the bottom of the shaft and freeing the opening into the shaft so that the exit can be made therethrough.

The means by which the objects of the invention are obtained are disclosed more fully with respect to the accompanying drawings, in which.

Figure 1:
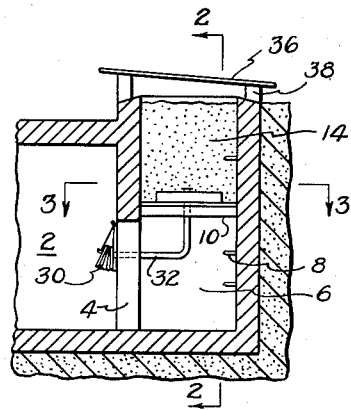
Figure 1 is a cross-sectional view through a filter containing emergency escape shaft.
Figure 2:
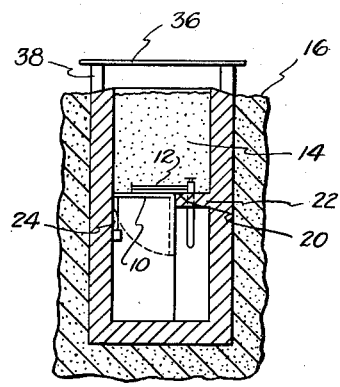
Figure 2 is a cross-sectional view on the line 2—2 of Figure 1.
Figure 3:
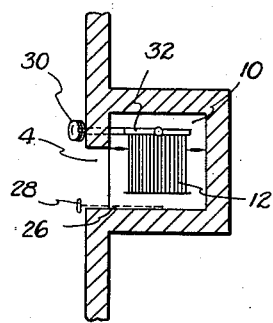
Figure 3 is a cross-sectional view on the line 3—3 of Figure 1.

As seen in Figure 1 the air raid shelter 2 communicates through opening 4 with a vertical shaft 6. This shaft may be provided with rungs 8 on one wall thereof to facilitate the climbing out of the shaft. Mounted within the shaft is a filter bottom 10, a portion of which is constructed as a filter holding grate 12 for supporting the filter material 14. The walls of the shaft 6 extend above the surface 16 of the ground.

Bottom 10 has one edge joined by hinges 20 to shaft portion 22, and is maintained in position by locking bolt 24 connected through chain 26 to a handle 28 positioned within the interior of air raid chamber 2. A bellows 30 connected through air duct 32 to grate 12 serves the purpose of drawing air through the filter material to chamber 2.

Shaft 6 is surmounted by a cover 36, beneath which are openings 38 for the passage of air to the filtering material.

Figure 4:
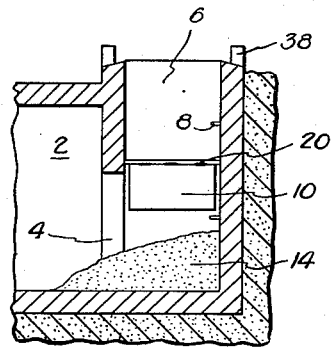
Figure 4 is a view similar to Figure 1 with the filter material shown dumped into the bottom of the shaft.

When the emergency exit must be used, handle 28 is pulled to unlock bolt 24. Bottom 10, therefore, swings down on hinges 20 and dumps the filter material into the bottom of the shaft. The filter material may flow out into chamber 2 as shown in Figure 4. If the opening is thereby clogged, the filter material can be pulled into chamber 2 to free opening 4. Exit can therefor be made through the shaft, it being noted that the cover 36 is secured so that it can be unfastened and removed from the interior of the shaft.

Bottom 10 may consist of a bottom slidably mounted so that it can be pulled horizontally into chamber 2.

Figure 5:
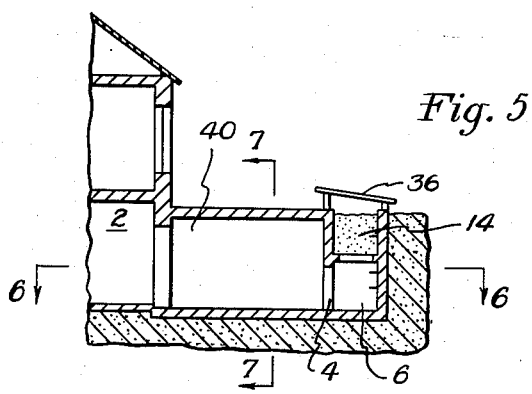
Figure 5 is a cross-sectional view through a modified form of the invention.
Figure 7:
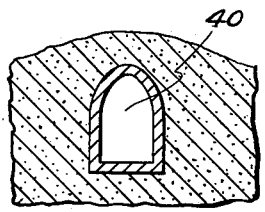
Figure 7 is a cross-sectional view on the line 7—7 of Figure 5.
Figure 6:
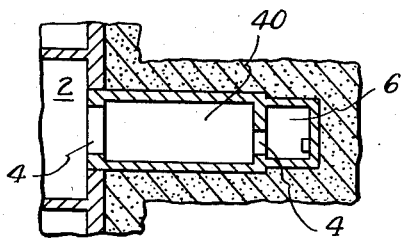
Figure 6 is a cross-sectional view on the line 6—6 of Figure 5.

In Figure 5 an embodiment of the invention is shown applied to a one-story house. Shaft 6 is spaced some distance from the house and connected thereto by the passageway or tunnel 40 of semi-elliptical cross section. Thus, the escape shaft is located in a position where it will not be covered or buried by the debris of the house should it be destroyed.

The supporting surface for the filter material may have the form of a grate through which the filtered air passes.

Again, the supporting surface may also consist of two parts, one of which is removable by hand, the other being fixed. In such a case, the fixed member may have the form of a grate, and the removable part being a solid surface.

The filter material support may also have the form disclosed in the copending application of Tietze et al., Serial No. 472,082, filed 30 November 1954, for Filter Material Support.

Having now described the means by which the objects of the invention are obtained, I claim:

1. In the combination of an air raid shelter and an escape shaft externally of said shelter and communicating therewith, sand or earth air filter material, supporting means for said filter material mounted in said shaft above the bottom thereof, and means for displacing said supporting means substantially free of the opening through the shaft and for dumping the filter material into the bottom of said shaft to open said shaft for escape purposes.

2. In the combination of claim 1, said supporting means further comprising a filter bottom and a grate.

3. In the combination of claim 2, said bottom having one edge hinged to said shaft, and manually actuated locking means for holding said bottom in closed position.

References Cited in the file of this patent

UNITED STATES PATENTS

| 842,661 | Hein | Jan. 29, 1907 |
| 945,375 | Carpenter | Jan. 4, 1910 |
| 1,538,292 | Lindsay | May 19, 1925 |
| 2,074,283 | Stauber | Mar. 16, 1937 |
| 2,729,966 | Lutteke | Jan. 10, 1956 |

FOREIGN PATENTS

| 28,371 | Netherlands | Nov. 15, 1932 |
| 99,514 | Switzerland | June 16, 1923 |
| 699,337 | Great Britain | Nov. 4, 1953 |
| 864,309 | Germany | Jan. 22, 1953 |
| 1,041,292 | France | May 27, 1953 |